United States Patent
Byrne

(10) Patent No.: US 8,478,234 B1
(45) Date of Patent: Jul. 2, 2013

(54) SYSTEM AND METHOD FOR CONTROLLING, MONITORING AND RECORDING OF WIRELESS COMMUNICATIONS IN PENAL INSTITUTIONS

(76) Inventor: Brian Francis Byrne, Plano, TX (US)

( * ) Notice: Subject to any disclaimer, the term of this patent is extended or adjusted under 35 U.S.C. 154(b) by 0 days.

(21) Appl. No.: 13/313,135

(22) Filed: Dec. 7, 2011

Related U.S. Application Data

(60) Provisional application No. 61/441,161, filed on Feb. 9, 2011.

(51) Int. Cl.
H04M 11/00 (2006.01)
H04M 3/42 (2006.01)

(52) U.S. Cl.
USPC ......... 455/406; 455/416; 455/426.2; 455/410

(58) Field of Classification Search
None
See application file for complete search history.

(56) References Cited

U.S. PATENT DOCUMENTS

| | | | |
|---|---|---|---|
| 6,052,454 A | 4/2000 | Kek | |
| 6,072,860 A | 6/2000 | Kek | |
| 7,158,621 B2 | 1/2007 | Bayne | |
| 7,164,921 B2 | 1/2007 | Owens | |
| 7,545,921 B2 | 6/2009 | Leonard | |
| 7,853,243 B2 * | 12/2010 | Hodge | 455/411 |
| 7,961,858 B2 | 6/2011 | Polozola | |
| 8,000,269 B1 | 8/2011 | Rae | |
| 8,019,354 B2 | 9/2011 | Rae | |
| 8,031,849 B1 | 10/2011 | Apple | |
| 8,160,219 B2 | 4/2012 | Bayne | |
| 2001/0036821 A1 * | 11/2001 | Gainsboro et al. | 455/410 |
| 2007/0041545 A1 * | 2/2007 | Gainsboro | 379/188 |
| 2010/0304712 A1 * | 12/2010 | Sweeney et al. | 455/410 |

OTHER PUBLICATIONS

Anonymous, Outlawed, Cell Phones Are Thriving in Prison Grits for Breakfast blog, Jan. 3, 2011, Austin, TX www.gritsforbreakfast.blogspot.com/2011/01/outlawed-cell-phones-are-thriving-in.html.

* cited by examiner

*Primary Examiner* — Erika A Washington

(57) ABSTRACT

A system for controlling, monitoring, and recording of telecommunications services associated with penal institutions is provided. The system comprises processor, memory, and application that receive a first transmission from a telephone number, the first transmission requesting a voice communication session with a portable electronic device associated with a penal institution. The system analyzes a first file containing a listing of at least one telephone number authorized to originate communication with the device, analyzes a second file describing authorized days and time periods for the device to engage in communication originated by the telephone number, and determines, based on the analysis of the first and second files, that the device is authorized to engage in the requested communication. The system also originates a second transmission to the device and connects the first and second transmissions with the second transmission, wherein the application monitors, records, and analyzes communications by the device.

26 Claims, 2 Drawing Sheets

SYSTEM AND METHOD FOR CONTROLLING, MONITORING AND RECORDING OF WIRELESS COMMUNICATIONS IN PENAL INSTITUTIONS

CROSS REFERENCE TO RELATED APPLICATIONS

This application claims the benefit of U.S. Provisional Application No. 61/441,161 filed Feb. 9, 2011 which is incorporated by reference in its entirety.

FIELD OF THE DISCLOSURE

The present disclosure is in the field of telecommunications services. More particularly, the present disclosure is in the technical field of wireless telecommunications services provided to detainees in penal institutions.

BACKGROUND OF THE DISCLOSURE

Detainees in jails, penitentiaries and other penal facilities seeking telephone contact with outside parties such as family members typically use public pay telephones provided by the facilities. Such telephones are located in common areas of a penal facility and provide little privacy for the detainee. Penal officers must oversee the movement of detainees to the telephone area. Officers also oversee a plurality of detainees waiting in line for telephone access in close contact with each other, a situation presenting safety risks for officers and detainees. Prison telephone usage is generally limited to outgoing calls only that are usually collect to the called party and often expensive.

Pay telephones in penal facilities are also limited in number due to space and cost limitations as well as manpower requirements associated with moving and guarding detainees using the phones. The limited quantity of phones, long waiting lines, limited call duration, and supervisory manpower requirements may result in higher financial and other costs to management of penal facilities. These factors also negatively impact detainee quality of life and safety of detainees and penal employees.

Contraband mobile telephones have become an increasing problem in penal facilities, further reducing penal facility earnings, compromising safety and presenting opportunities for penal employee corruption. While penal officials have taken steps to reduce contraband mobile phones, the expanded capabilities of small portable devices have made such devices more valuable to detainees. This has increased economic incentives for penal employees to facilitate the smuggling and trafficking of these devices in prisons. With a contraband mobile device that has Internet access, a detainee may view telephone directories, maps and photographs for criminal purposes. Gang violence and drug trafficking are increasingly being managed online, allowing persons in penal facilities to continue engaging in criminal activity while incarcerated. Traditional solutions such as blocking or jamming cell phone signals have proven impractical.

SUMMARY OF THE DISCLOSURE

In an embodiment, a system for controlling, monitoring, and recording of wireless telecommunications services associated with penal institutions is provided. The system comprises a processor, a memory, and an application that, when executed on the processor, receives a first transmission from a first telephone number, the first transmission requesting a voice communication session with a portable electronic device associated with a penal institution. The system also analyzes a first file containing a listing of at least one telephone number authorized to originate voice communication sessions with the portable electronic device. The system also analyzes a second file describing authorized days and time periods for the portable electronic device to engage in voice communication sessions originated by the first telephone number. The system also determines, based on the analysis of the first file and the second file, that the portable electronic device is authorized to engage in the voice communication session requested in the first transmission. The system also originates a second transmission to the portable electronic device. The system also connects the first transmission with the second transmission, wherein the application monitors, records, and analyzes voice communication sessions engaged in by the portable electronic device.

In an embodiment, a system for controlling, monitoring, and recording of wireless telecommunications services associated with penal institutions is provided. The system comprises a processor, a memory, and an application that, when executed on the processor, receives a first transmission from a portable electronic device associated with a penal institution, the first transmission requesting a voice communication session with a first external telephone number. The system also analyzes a first file describing authorized usage days and time periods for the portable electronic device. The system also analyzes a second file containing a listing of at least one external telephone number approved to engage in voice communication sessions with the portable electronic device. The system also determines, based on the analysis of the first file and the second file, that the portable electronic device is authorized for the requested voice communication session. The system also originates a second transmission to the first external telephone number and connects the first transmission with the second transmission wherein the application monitors, records, and analyzes voice communication sessions engaged in by the portable electronic device.

In an embodiment, a method for controlling, monitoring, and recording of wireless telecommunications services associated with penal institutions is provided. The method comprises a computer receiving a first voice transmission from a first external telephone number requesting a voice communication session with a first portable electronic device wherein the portable electronic device is in possession of a detainee of a penal facility. The method also comprises the computer analyzing a first file describing external telephone numbers and associated parties permitted to access telecommunications services associated with detainees of penal facilities. The method also comprises the computer analyzing a second file listing a plurality of portable electronic devices associated with at least one penal facility that are permitted to engage in voice communication sessions with external telephone numbers. The method also comprises the computer analyzing a third file listing days of the week and times of day during which the first portable electronic device is permitted to engage in voice communication sessions with external telephone numbers. The method also comprises the computer determining, based on analysis of the first file, the second file, and the third file that the requested voice communication session is authorized. The method also comprises the computer initiating a second voice transmission with the portable electronic device and linking the first voice transmission with the second voice transmission. The method also comprises the computer monitoring, recording, and analyzing voice communication sessions engaged in by the portable electronic device.

In an embodiment, a system for controlling, monitoring, and recording of wireless telecommunications services associated with penal institutions is provided. The system comprises a portable electronic device and an application that, when executed on the portable electronic device, dials a first telephone number in response to receiving a first key entry. The system also displays a menu presenting a list of destination telephone numbers and receives a second key entry comprising a selection of a first destination telephone number from the displayed menu listing destination telephone numbers. The system also transmits a request to initiate a voice communication session with the first destination telephone number based on receiving the second key entry.

DETAILED DESCRIPTION OF THE INVENTION

Figure 1:
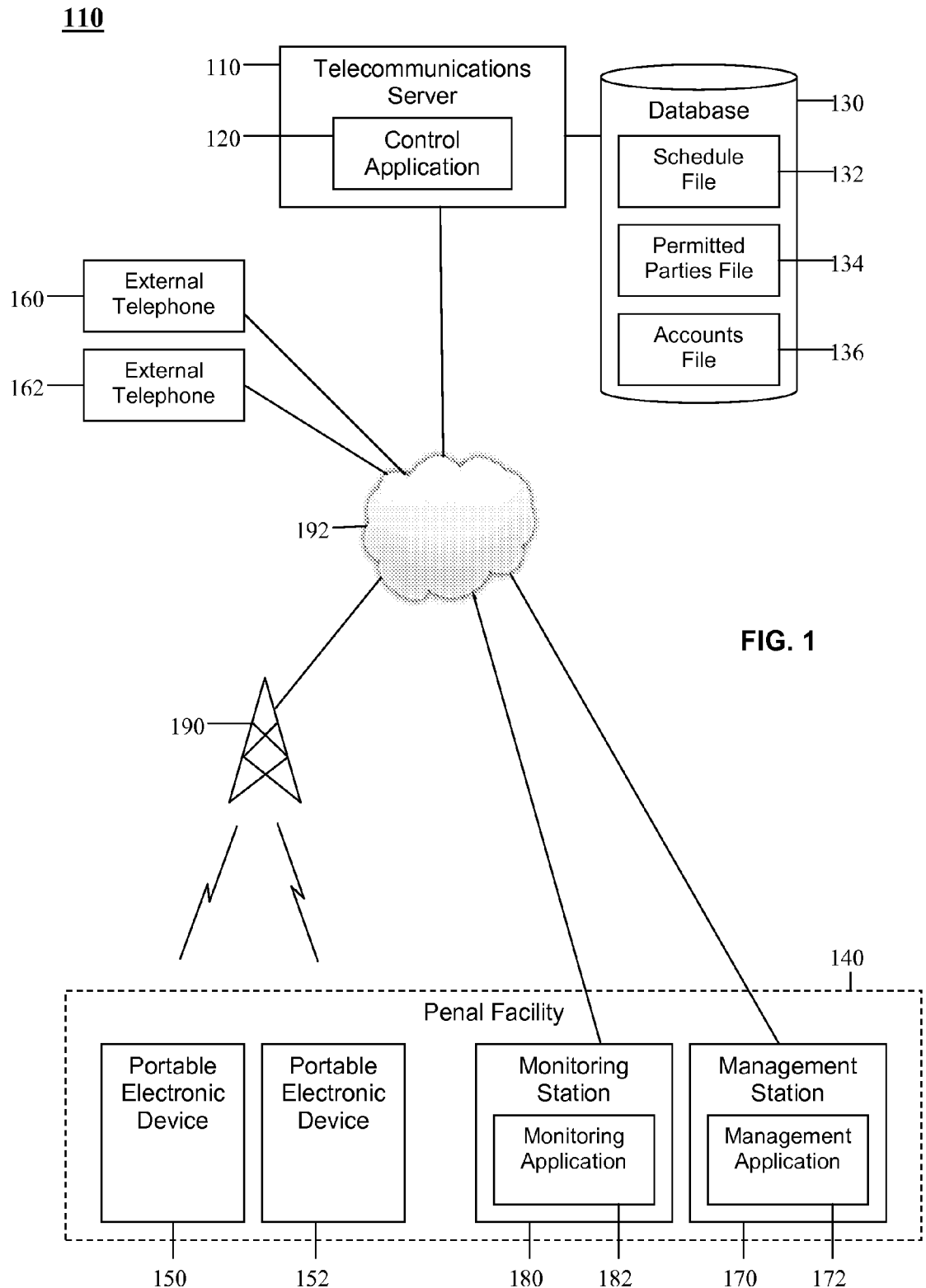
FIG. 1 depicts a block diagram of a system for controlling, monitoring, and recording of wireless telecommunications services associated with penal institutions in accordance with an embodiment of the present disclosure.

The present disclosure teaches systems and methods of providing incoming and outgoing telecommunications services to persons incarcerated in penal facilities. A plurality of controls is provided herein that may reduce contraband devices and encourage good behavior by detainees, penal employees, and others. Portable electronic devices, primarily mobile telephones, are provided to detainees that have exhibited acceptable behavior and are not determined to be security risks. The devices are configured to allow only transmissions with a single telephone number associated with an application taught herein. After applying controls, the application then connects outside calling parties to the detainee or connects the calling detainee to the destination party. In contrast to existing implementations, inbound calls to a detainee are permitted.

The application executes on a computer, for example a private branch exchange (PBX) that may be located on the premises of a penal institution or away from the penal institution. A family member, attorney, or other preapproved party calling from a preapproved telephone number and telephone initiates a call to a telephone number associated with the application. The calling party is asked to enter a name or other identification of the detainee with whom they wish to speak. The calling party speaks or otherwise enters this information. The application consults stored records listing names and other identifying information of detainees permitted to receive incoming calls from external calling parties. The application verifies that the detainee is included in these records and is permitted to receive incoming calls from approved external calling parties and telephones on that day of the week and during that time period. The application also verifies that the calling party and originating external telephone number are included in a list of preapproved calling parties and telephone numbers. The application finally verifies that sufficient funds are in a detainee account to pay for the incoming call. Once the application has completed these verification steps, the application then places a separate call to a specially modified portable electronic device in possession of the detainee. When the detainee answers, the application joins the separate call legs and remains on the line, recording the call. The application monitors the call for unusual activity such as the external calling party allowing a different party to join the call or attempting to switch the call to a different telephone or number or conference another number into the call. The incoming call is timed and the detainee's account is charged. The call may also be monitored by at least one authorized person who may join, interrupt or terminate the call at any time.

The present disclosure also teaches a detainee making outgoing calls in a similar manner as with incoming calls. A detainee provided a portable electronic device taught herein makes a keypad entry that contacts the PBX. The PBX receives this transmission and the application executing thereon consults stored records describing permitted days and times for outgoing calls by the detainee. The stored records also list the destination telephone numbers of parties, for example family members or an attorney, that the detainee is permitted to call at the allowed times. The stored records also contain account information for the detainee regarding calling minutes remaining and/or available funds on deposit to pay for phone usage.

After determining that the detainee's request is on a permitted day and within a permitted time period and that minutes and funds are available, the application consults the list of permitted recipient telephone numbers. The detainee may be provided the list and/or may enter or speak the desired name or telephone number he or she wishes to call. The application then calls the designated recipient telephone number and if the individual with which the detainee wishes to speak is available, the application connects the detainee with the called party, for example the detainee's spouse or children.

As with incoming calls, the detainee and the called party may remain connected as two separate call legs with the application remaining on the line and actively monitoring the conversation. The call may be subject to time limitations associated with program rules or based on account balances. The application may interrupt or terminate the conversation at any time and an authorized person may "barge in" if necessary. All conversations are recorded and are subject to review.

The portable electronic device provided to the detainee is locked down to prevent tampering or hacking. It is securely configured to place and receive calls only with a single telephone number associated with the application taught herein executing on the PBX. The portable electronic device is unable to engage in any short message service (SMS) messaging, commonly referred to as text messaging, and cannot access any Internet services. The only actions permitted with the device are placing calls to and receiving calls from the one number associated with the application and specific to the device. The device is physically secured such that it cannot be opened or otherwise tampered with. The device may be configured to allow its movements to be tracked within and/or outside a penal facility. This feature may be especially useful when portable electronic devices are provided to persons in work release programs.

By providing deserving detainees telephone privileges that they may use in the safety and privacy of their cells or living areas, the system and methods of the present disclosure may reduce contraband cell phones in penal facilities by removing incentives for penal employees to engage in corrupt behavior. The legitimate provision of incoming and outgoing telephone service to deserving detainees may result in less temptation for penal employees to become derelict or corrupt by assisting in the smuggling of contraband devices into penal facilities.

The systems and methods taught herein may also reduce the need for public telephones in penal facilities that may only be used for outgoing collect calls and present security risks. With public phones, detainees must physically leave their secure areas and wait in line. Public phones are also often very expensive which may be a burden on family members or others that must pay the collect phone charges. The present disclosure provides fairer and more private systems for deserving detainees wherein incentives for penal employee corruption are reduced and overall penal facility safety may be enhanced.

Turning to FIG. 1, a system 100 of controlling, monitoring and recording of wireless telecommunications services in penal institutions is provided. The system 100 comprises a telecommunications server 110, a control application 120, a database 130, a penal facility 140, portable electronic devices 150, 152, external telephones 160, 162, a management computer 170, a monitoring computer 180, a base transceiver system 190, and a network 192.

The telecommunications server 110 is a software-based telecommunications system server or private branch exchange (PBX) capable of receiving, switching, placing and monitoring voice and data transmissions. The telecommunications server 110 may be situated at the penal facility 140 or may be situated elsewhere, for example on the premises of a central office or other facility of a telecommunication services provider. The telecommunications server 110 may provide the services described herein to more than one penal facility 140.

The control application 120 executes on the telecommunications server 110 and provides the primary services associated with voice telecommunications services taught herein for persons incarcerated in or associated with the penal facility 140. The control application 120 maintains a file of unique telephone numbers called by detainees from the portable electronic devices 150, 152 provided them. Each portable electronic device 150, 152 is registered by the control application 120 to a unique extension on the telecommunications server 110. The control application 120 allows calls from the portable electronic device 150 to the unique extension assigned to it in the telecommunications server 110.

The portable electronic device 150 as configured and provided to the detainee cannot receive calls from any number other than the number associated with the unique extension securely configured for it in the telecommunications server 110. Likewise, the portable electronic device 150 cannot place calls to any other number other than the number associated with the unique extension. The control application 120 receives calls from external telephones 160, 162 wherein the calls are placed by family members, attorneys or other persons approved to place calls to certain detainees. The external telephones 160, 162 may use wired or wireless connections and their calls may be transmitted via the Internet using a protocol such as Voice Over Internet Protocol (VoIP).

The control application 120 employs various methods to ensure that the device originating the call to the telecommunications server 110 is in fact the approved external telephone 160 and not an impostor or other device. The control application 120 may analyze the initial and continuing electronic stream associated with the call from the external telephone 160 and may extract and analyze the International Mobile Equipment Identifier (IMEI) or other identifying data contained in these transmissions. The control application 120 may compare the extracted data with information stored in the telecommunications server 110 or elsewhere for verification.

The control application 120 may employ other well known techniques to validate that the call is originated by the external telephone 160 and by a person authorized to place calls to detainees. The control application 120 may require the caller to enter information provided only to the caller and may use caller identification and voice recognition software or other tools to determine that the person calling from the external telephone 160 is in fact an authorized caller. The control application 120 also starts a recording of some or all of these interactions.

After ascertaining that the call to the telecommunications server 110 was in fact originated by the external telephone 160 and after determining that the caller is authorized to place calls to detainees, the control application 120 instructs the caller to provide the name and/or other identifying information for the detainee they wish to call. The control application 120 then performs a series of additional steps before connecting the caller to the detainee. The control application 120 analyzes a schedule file 132 stored in the database 130 to determine days of the week and times of day that the detainee is permitted to receive incoming calls. In an embodiment, some scheduling information may be stored locally in the portable electronic device 150. The portable electronic device 150 may be configured such that it cannot receive externally originated transmissions of any kind outside of permitted calling times.

After the control application 120 determines that the calling request is at an allowed time, the control application 120 consults a permitted parties file 134 stored in the database 130 describing detainees that the external telephone 160 and associated person may call. In an embodiment, an attorney may be authorized to call more than one detainee. The permitted parties file 134 contains information about detainees including names and other identification that is used to assure that only authorized detainees may receive calls. The permitted parties file 134 may also identify the portable electronic device 150 assigned to a particular detainee at a particular time. Portable electronic devices 150, 152 may be rotated among detainees at random times for security reasons.

As noted, the calling party using the external telephone 160 is instructed to enter the name or other identification of the detainee with which the calling party wishes to speak. The control application 120 checks this against the permitted parties file 134. The calling party may provide selection information by keypad entry or verbally. The control application 120 may alternatively present a listing viewable on the external telephone 160 of allowed detainees that the external telephone 160 the authorized caller may call. This is predicated on the external telephone 160 having functionality to display this information and accept selections of items of this information.

When the control application 120 determines that calls to the selected detainee are permitted at that time by the calling party, the control application 120 dials the portable electronic device 150 in the possession of the detainee. This is done with the external telephone 160 not yet on the line. The call from the external telephone 160 to the detainee may be completed as two separate call legs by the control application 120. The initial call by the external telephone to the telecommunications server 110 may be a first call leg that is held by the telecommunications server 110. The control application 120 then initiates a second call leg to the portable electronic device 150 in the possession of the detainee. When the portable electronic device 150 is answered and the control application 120 determines that the person answering is the detainee, the control application 120 then links the two call legs, effectively bringing the calling party into the call. The control application 120 remains present to monitor the call.

While the call is ongoing, the telecommunications server 110 or another device take steps to assure that the detainee and the approved caller remain on the call and do not allow unauthorized persons to participate in the call. These steps may include the use of voice recognition software or technology that detects if the calling party attempts to transfer the call to another telephone number or device.

Before connecting the calling party with the detainee, the control application 120 additionally consults an accounts file 136 stored in the database 130 to determine a quantity of minutes and/or funds presently available for use by the detainee. Management of the penal facility 140 may set policies limiting call durations or minutes of permitted usage per day, per weeks or during another time period. Detainees may be charged per minute used for outgoing as well as incoming calls. Detainees may deposit funds into accounts accessible by the control application 120. In an embodiment, a detainee may be extended credit.

The present disclosure also provides for detainees to originate outgoing calls to family members, attorneys, and other authorized persons under certain conditions with method steps similar to those used in completing incoming calls to detainees. As with incoming calls, only authorized external telephones 160, 162 and persons associated with those external telephones 160, 162 are permitted to receive outgoing calls originated by detainees during specific time periods. In an embodiment, the group of external telephones 160, 162 and parties that are permitted to receive outgoing calls from the detainee may differ from the external telephones 160, 162 and associated numbers and parties that are permitted to call the detainee in incoming calls.

The detainee seeking to call an external telephone 160 calls the telephone number associated with the control application 150 and the telecommunications server 110. This is the only telephone number that the detainee may call using the portable electronic device 150. In an embodiment, the detainee may enter press the keypad numeral 1 or make another entry to initiate an outgoing call. The control application 120 receives the call, checks the schedule file 132, the permitted parties file 134, and the accounts file 136 as it does with incoming calls. The control application 120 ascertains that the day and time of the call are permitted. The control application 120 also determines that the external telephone 160, its associated phone number and the person receiving the outgoing call from the detainee are permitted and that there are funds and/or minutes available in the detainee's account. Once these requirements are determined to be met, the control application 120 calls the external telephone 160 associated with the destination party. As with incoming calls, the control application 120 completes outgoing calls as two separate call legs and remains on the line recording the call and monitoring it for prohibited activity including participation by unauthorized parties in the call.

The system 100 also comprises at least one management station 170 that is a computer used by persons with management responsibilities and associated access privileges to manage the control application 120 and various aspects of the calling program provided herein. These persons are provided system administrator privileges that include the authority to add and remove detainees to and from the calling program and make various changes to calling privileges. System administrators and others provided access to the management station 170 access a management application 172 executing at least partially on the management station 170. They use the management application 172 to configure the control application 120 and manipulate files stored in the database 130. In addition to adding, removing and changing detainee calling privileges, schedules and accounts, these actions comprise adding and deleting phone numbers of external telephones 160, 162 and associated persons authorized to speak with detainees. System administrators may use a browser as a "front end" or client software tool provided by the management application 172 to access the control application 120, the database 130 and other components. The management application 172 may provide simplified web forms to add detainees and make other program changes. System administrators may be wardens, senior correction officials, or others that develop and implement policies regarding program administration as a whole.

The system 100 also comprises at least one monitoring station 180 that may be a computer used by authorized persons to listen to outgoing or incoming detainee calls on a live or recorded basis. These authorized persons may also use a monitoring application 182 executing at least partially on the monitoring station 180 that comprises electronic tools used in forensic activities made possible by the teachings of the present disclosure. These activities include assisting in the detection of prohibited behavior by detainees, outside parties, and others including penal officers who may be violating or compromising penal facility regulations. The monitoring station 180 may be located on the premises of the penal facility 140 or elsewhere. The monitoring application 182 may also use a browser to access information useful in performing this analysis. As with the management application 172, this may involve accessing some areas of the control application 120 and the database 130.

The present disclosure also provides for client administrator privileges to be provided to users of the monitoring station 180. These privileges are less broad than system administrator privileges and include selectively monitoring calls, accessing tools to analyze usage patterns, and managing and inventorying portable electronic devices 150, 152 within and outside the penal facility 140. Monitoring may include passive listening to calls as well as "barge in" wherein a client administrator or system administrator may intervene in the call and speak to one or more parties to the call.

In an embodiment, the management station 170 and the monitoring station 180 may be the same physical computer. The management station 170 and the monitoring station 180 are general purpose computers. In an embodiment, there may exist a plurality of management stations 170 and monitoring stations 180. While the management station 170 and the monitoring station 180 are depicted in FIG. 1 as being contained within the penal facility 140, in an embodiment these components may be located elsewhere. In an embodiment, some individuals may be provided access rights to the control application 120, the database 130 and other components that combine aspects of system administrator privileges and client administrator privileges.

The portable electronic devices 150, 152 may be mobile telephones, personal digital assistants (PDA), media players or other wireless devices capable of originating and receiving voice transmissions. As noted, portable electronic devices 150, 152 are configured to have contact with only a single telephone number associated with the control application 120 executing on the telecommunications server 110. The detainee using the portable electronic device 150 hears various messages provided by the control application 120, for example a warning that an inbound or outbound call will soon terminate because of funds or schedule limitations. In an embodiment, portable electronic devices 150, 152 and limited areas of the control application 120 may be accessible by the detainee to obtain information such as detainees' current account balances and permitted calling schedules. In an embodiment, detainees are provided voice mail accounts protected by personal identification numbers (PIN). Voice mail functionality may be used by management of the penal facility 140 to provide general distribution messages and announcements to individual detainees and groups of detainees. Detainees cannot delete voice mail messages and authorized persons may listen to voice mail messages.

The limitations to and other aspects described herein of the portable electronic devices 150, 152 may be configured directly into the devices. They may alternatively or in addition be configured from a remote computer such as the management station 170 or other device. The portable electronic devices 150, 152 are physically configured such that they cannot be physically opened and the subscriber identification modules (SIM) therein cannot be removed or otherwise tampered with. They may bear visible insignia that designate them as legitimate portable electronic devices 150, 152 associated with the program taught herein.

The portable electronic devices 150, 152 may be configured with global positioning system (GPS) functionality so that their physical movement within or outside the penal facility 140 may be monitored. In an example, a first detainee with the portable electronic device 150 may be housed in a first cellblock and work as an assistant in the warden's office of the penal facility 140. A second detainee with the portable electronic device 152 may be housed in a second cellblock and work in the laundry of the penal facility 140. The first and second detainees may rarely or never move in the same areas of the penal facility 140 or be in the same areas at specific known times. Movements of the portable electronic devices 150, 152 may be tracked using GPS or other technology such that unusual activity may be detected and investigated.

The present disclosure also teaches the use of portable electronic devices 150, 152 as provided herein by persons not confined to the penal facility 140 but instead subject to parole or in a work release program. Offenders not physically incarcerated but subject to significant correctional oversight may be provided portable electronic devices 150, 152 for use in parole and work release programs. GPS and other tracking technology incorporated into the portable electronic devices 150, 152 may be useful in enforcing physical movement restrictions on non-incarcerated offenders.

The penal facility 140 is a secure building or buildings comprising a penal institution used to incarcerate individuals as detainees subject to court-imposed sentences. The penal facility 140 may be a penitentiary, prison, jail, camp, detention center or other facility operated by a federal, state, provincial, municipal, military or other public body or agency. The penal facility 140 may alternatively be privately operated under contract with a court, correctional agency or other public body. In an embodiment, the penal facility 140 may be a public hospital or other institution in which non-offending persons reside as wards of a state, province, municipality or other public body.

The systems and methods of the present disclosure may provide a fairer, safer and less corruption-prone alternative to prison telephone systems commonly in use. As taught herein, detainees may not have to be physically moved to place and receive calls as they must be in the case of public phones in prisons, an enhancement to detainee and penal employee safety. Detainees therefore do not have to wait in line for phones, a situation that may create increased tension between detainees being in close physical proximity to each other. Detainees are able to engage in calls in safety and privacy of their living quarters. Detainees are able to receive incoming calls, which is generally not possible with existing prison phone systems. Detainees are relieved of the burden of making collect calls that are often very expensive to the party accepting charges.

Detainees in penal facilities 140 demand and have a right to telephone services and have historically demonstrated that they will find ways to satisfy this demand using legitimate means or not. Providing contraband mobile telephones to inmates of penal facilities and allowing their trafficking is a temptation to penal employees when financial or other incentives are offered. The systems and methods taught herein that legitimately satisfy demand for communications services for deserving detainees may remove much of the economic incentive that may result in corruption of prison employees. The program taught herein reduces the exposure to corrupting influences on prison employees. It also encourages and rewards good behavior by detainees and may ultimately reduce recidivism given the increased amount of telephone contact and enhanced quality of voice interaction facilitated with family members and others.

In an embodiment, aspects of the systems and methods taught herein may execute on the portable electronic device 150. A combination of hardware and software components resident and executing on the portable electronic device 150 may work in conjunction with the control application 120 and the telecommunications server 110. For outgoing calls by detainees, an application executing on the portable electronic device 150 may dial a first telephone number in response to receiving a first key entry by a detainee. The application may then display a menu presenting a list of destination telephone numbers. It receives a second key entry comprising a selection of a first destination telephone number from the displayed menu listing destination telephone numbers. The application then transmits a request to initiate a voice communication session with the first destination telephone number based on receiving the second key entry.

The systems and methods of the present disclosure teach the provision of telecommunications services to detainees incarcerated in and otherwise associated with the penal facility 140. Lawful wireless and other communications by employees of and visitors to the penal facility 140 as well as other non-detainees are not affected by the actions of the components provided herein. In addition, the systems and methods of the present disclosure teach that wireless communication nodes and other similar wireless signal detecting and managing devices need not be placed on the premises of the penal facility 140.

Figure 2:
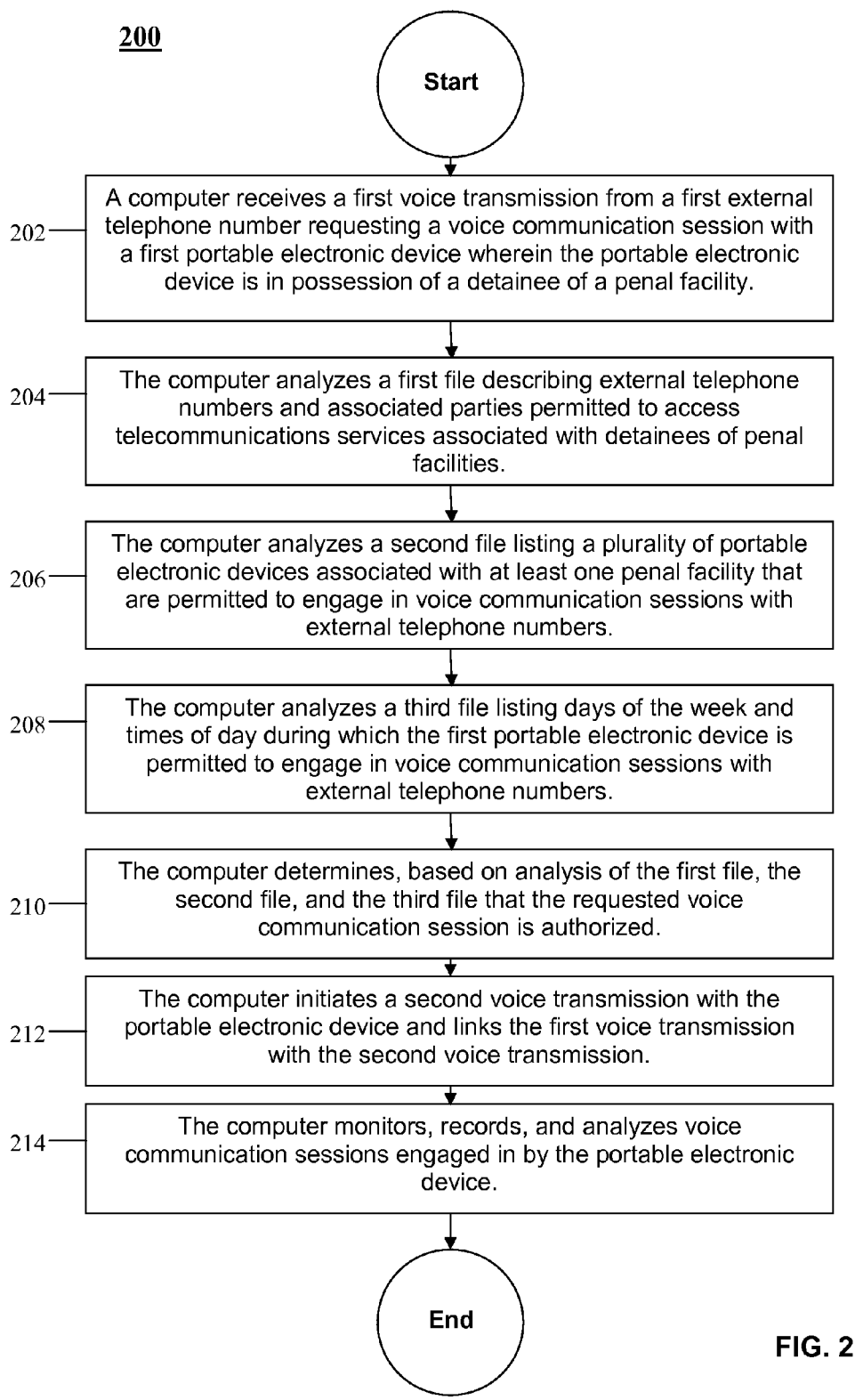
FIG. 2 depicts a flowchart of a method for controlling, monitoring, and recording of wireless telecommunications services associated with penal institutions in accordance with an embodiment of the present disclosure.

Turning FIG. 2, a method 200 for controlling, monitoring, and recording of wireless telecommunications services associated with penal institutions is provided. Beginning at block 202, a computer receives a first voice transmission from a first external telephone number requesting a voice communication session with a first portable electronic device wherein the portable electronic device is in possession of a detainee of a penal facility. At block 204, the computer analyzes a first file describing external telephone numbers and associated parties permitted to access telecommunications services associated with detainees of penal facilities. At block 206, the computer analyzes a second file listing a plurality of portable electronic devices associated with at least one penal facility that are permitted to engage in voice communication sessions with external telephone numbers. At block 208, the computer analyzes a third file listing days of the week and times of day during which the first portable electronic device is permitted to engage in voice communication sessions with external telephone numbers. At block 210, the computer determines, based on analysis of the first file, the second file, and the third file that the requested voice communication session is authorized. At block 212, the computer initiates a second voice transmission with the portable electronic device and links the first voice transmission with the second voice transmission. At block 214, the computer monitors, records, and analyzes voice communication sessions engaged in by the portable electronic device.

What is claimed is:

1. A system for controlling, monitoring, and recording of wireless telecommunications services associated with penal institutions, comprising:
   a processor;
   a memory; and
   an application that, when executed on the processor,
      receives a first transmission from a first telephone number, the first transmission requesting a voice communication session with a portable electronic device associated with a penal institution,
      analyzes a first file containing a listing of at least one telephone number authorized to originate voice communication sessions with the portable electronic device,
      analyzes a second file describing authorized days and time periods for the portable electronic device to engage in voice communication sessions originated by the first telephone number,
      determines, based on the analysis of the first file and the second file, that the portable electronic device is authorized to engage in the voice communication session requested in the first transmission,
      originates a second transmission to the portable electronic device, and
      connects the first transmission with the second transmission,
   wherein the application monitors, records, and analyzes voice communication sessions engaged in by the portable electronic device, wherein the portable electronic device is in possession of a detainee of the penal institution, and wherein the portable electronic device receives transmissions solely from the application.

2. The system of claim 1, wherein connecting the first transmission with the second transmission enables the requested voice communication between a predetermined authorized party associated with the first telephone number and a user of the portable electronic device.

3. The system of claim 1, wherein the portable electronic device is alternatively in the possession of a person not incarcerated in the penal institution and subject to a work release program.

4. The system of claim 1, wherein analyzing the first file comprises determining that the first telephone number is contained in the listing of at least one telephone number authorized to originate voice communication sessions with the portable electronic device.

5. The system of claim 1, wherein the application executes on a private branch exchange (PBX) situated one of on the premises of the penal institution and at a location other than the penal institution.

6. The system of claim 1, wherein the application does not originate the second transmission unless requirements described in the first file and described in the second file are met.

7. The system of claim 1, wherein the application limits time durations of voice communication sessions between at least the first telephone number and the portable electronic device.

8. The system of claim 1, wherein the application charges a prepaid account associated with a detainee in possession of the portable electronic device.

9. The system of claim 1, wherein the application electronically identifies parties originating calls from the first telephone number and detects unauthorized attempt to transfer originated calls and conference in unauthorized parties to originated calls.

10. The system of claim 1, wherein the system does not rely on wireless communication nodes situated on the premises of the penal institution to at least one of direct and detect wireless traffic associated with the penal institution.

11. A system for controlling, monitoring, and recording of wireless telecommunications services associated with penal institutions, comprising:
    a processor;
    a memory; and
    an application that, when executed on the processor,
       receives a first transmission from a portable electronic device associated with a penal institution, the first transmission requesting a voice communication session with a first external telephone number,
       analyzes a first file describing authorized usage days and time periods for the portable electronic device,
       analyzes a second file containing a listing of at least one external telephone number approved to engage in voice communication sessions with the portable electronic device,
       determines, based on the analysis of the first file and the second file, that the portable electronic device is authorized for the requested voice communication session,
       originates a second transmission to the first external telephone number, and
       connects the first transmission with the second transmission,
    wherein the application monitors, records, and analyzes voice communication sessions engaged in by the portable electronic device, wherein the portable electronic device is in possession of a detainee of the penal institution, and wherein the portable electronic device originates transmissions solely to the application.

12. The system of claim 11, wherein connecting the first transmission with the second transmission enables the requested voice communication between a user of the portable electronic device with a predetermined authorized party associated with the first external telephone number.

13. The system of claim 11, wherein the portable electronic device is alternatively in the possession of a person not incarcerated in the penal facility and subject to a work release program.

14. The system of claim 11, wherein analyzing the second file comprises determining that the first external telephone number is contained in the listing of at least one external telephone number approved to engage in voice communication sessions with the portable electronic device.

15. The system of claim 11, wherein the application executes on a private branch exchange (PBX) physically situated one of on the premises of the penal facility and at a location other than the penal facility.

16. The system of claim 11, wherein the wherein the application electronically identifies parties receiving calls at the first external telephone number and detects unauthorized attempts to transfer received calls and conference in unauthorized parties to received calls.

17. The system of claim 11, wherein the application does not originate the second transmission unless requirements described in the first file and described in the second file are met.

18. The system of claim 11, wherein the application limits time durations of voice communication sessions between the portable electronic device and at least the first external telephone number.

19. The system of claim 11, wherein the application charges a prepaid account associated with a detainee in possession of the portable electronic device.

20. The system of claim 11, wherein the application monitors movement of the portable electronic device and generates alerts when a location of the portable electronic device is determined to be outside a permitted area.

21. A method for controlling, monitoring, and recording of wireless telecommunications services associated with penal institutions, comprising:
   a computer receiving a first voice transmission from a first external telephone number requesting a voice communication session with a portable electronic device wherein the portable electronic device is in possession of a detainee of a penal facility;
   the computer analyzing a first file describing external telephone numbers and associated parties permitted to access telecommunications services associated with detainees of penal facilities;
   the computer analyzing a second file listing a plurality of portable electronic devices associated with at least one penal facility that are permitted to engage in voice communication sessions with external telephone numbers;
   the computer analyzing a third file listing days of the week and times of day during which the first portable electronic device is permitted to engage in voice communication sessions with external telephone numbers;
   the computer determining, based on analysis of the first file, the second file, and the third file that the requested voice communication session is authorized;
   the computer initiating a second voice transmission with the portable electronic device and linking the first voice transmission with the second voice transmission;
   the computer monitoring, recording, and analyzing voice communication sessions engaged in by the portable electronic device;
   the computer receiving a third voice transmission from the portable electronic device requesting a voice communication session with the first external telephone number;
   the computer analyzing the first file further describing external telephone numbers and associated parties permitted to engage in voice communication sessions originated by detainees of penal facilities;
   the computer analyzing the second file and analyzing the third file;
   the computer determining, based on analysis of the first file, the second file, and the third file that the requested voice communication session is authorized;
   the computer initiating a fourth voice transmission with the first external telephone number and linking the first voice transmission with the second voice transmission; and
   the computer charging an account associated with the first portable electronic device for the voice communication session,
wherein the computer analyzing the first file, the second file, and the third file further comprises the computer at least determining that the first external telephone number and associated parties are included in listings of external telephone numbers and associated parties authorized to engage in voice communication sessions with the portable electronic device, wherein the computer is a private branch exchange (PBX) and is situated one of at the penal facility and at a location other than the penal facility, wherein the computer does not manage wireless communications originated and received by employees of and visitors to the penal facility, and wherein the computer uses one of caller identification and examination of an International Mobile Equipment Identifier (IMEI) to verify the first external telephone number.

22. The method of claim 21, wherein at least one of an attempt by a party associated with an external telephone number to allow unauthorized parties to join a call and an attempt to transfer a call to one of another telephone number and phone is detected, monitored and addressed.

23. The method of claim 21, further comprising a management station accessible to persons with rights to add and remove calling privileges for detainees.

24. The method of claim 23, wherein the rights additionally comprise at least one of adding and deleting of external telephone numbers and persons with privileges to originate and receive communications with detainees.

25. The method of claim 21, further comprising a monitoring station accessible to persons with rights to at least one of monitor calls between detainees and external telephone numbers, analyze usage patterns, and manage and inventory portable electronic devices.

26. The method of claim 21, wherein portable electronic devices are rotated among detainees.

* * * * *